United States Patent [19]
Kolvites et al.

[11] Patent Number: 5,159,258
[45] Date of Patent: Oct. 27, 1992

[54] RECHARGEABLE BATTERY CONDITIONER UNIT

[76] Inventors: Albert Kolvites, RR3 Box 117A Yeager Rd., Mountaintop, Pa. 18707; Maurice S. Kanbar, 4 E. 77th St., New York, N.Y. 10021

[21] Appl. No.: 729,698

[22] Filed: Jul. 15, 1991

[51] Int. Cl.$^5$ .............................................. H02J 7/00
[52] U.S. Cl. ............................................ 320/14; 320/2
[58] Field of Search ................... 320/2, 4, 5, 9, 10, 320/13, 14, 21, 39, 43, 48

[56] References Cited

U.S. PATENT DOCUMENTS

| | | | |
|---|---|---|---|
| 3,413,534 | 11/1968 | Stringer | 388/819 |
| 3,603,861 | 9/1971 | Torrance | 320/14 |
| 4,084,124 | 4/1978 | Kapustka | 320/9 |
| 4,302,714 | 11/1981 | Yefsky | 320/5 |
| 4,342,954 | 8/1982 | Griffith | 320/14 |
| 4,558,270 | 12/1985 | Liautaud et al. | 320/2 |
| 4,563,629 | 1/1986 | Keiper | 320/2 X |
| 4,609,860 | 9/1986 | Fasen | 320/14 |
| 4,670,703 | 6/1987 | Williams | 320/21 X |
| 4,849,681 | 6/1989 | Schmidt et al. | 320/13 |
| 4,878,007 | 10/1989 | Gábor et al. | 320/14 |

Primary Examiner—Steven L. Stephan
Assistant Examiner—Kristine Peckman
Attorney, Agent, or Firm—Michael Ebert

[57] ABSTRACT

A piggyback conditioner unit usable in conjunction with a Ni-Cad battery power pack and a standard charger for the pack, the pack being normally adapted to be seated on and connected to the charger for recharging. The power pack is subject to a "memory effect" that decreases its ability to regain its rated energy capacity unless before being recharged, it is first discharged from its existing state of discharge to a deep discharge state. When put to use, the battery conditioner unit is physically and electrically interposed between the charger and the power pack to create an assembly in which the unit is seated on and electrically connected to the charger, and the pack is seated on and electrically connected to the unit. The unit includes means to further discharge the power pack seated thereon until a deep discharge state is reached, which condition is reflected in a reduced pack voltage that is sensed to automatically activate the charger which then proceeds to recharge the pack. When the pack is recharged to its full rated capacity, this condition is sensed by the charger which then switches to a low-current maintenance charge state. The resultant drop in charger voltage is sensed by the unit and indicated to inform the user that the pack is now fully recharged and in condition for reuse.

10 Claims, 2 Drawing Sheets

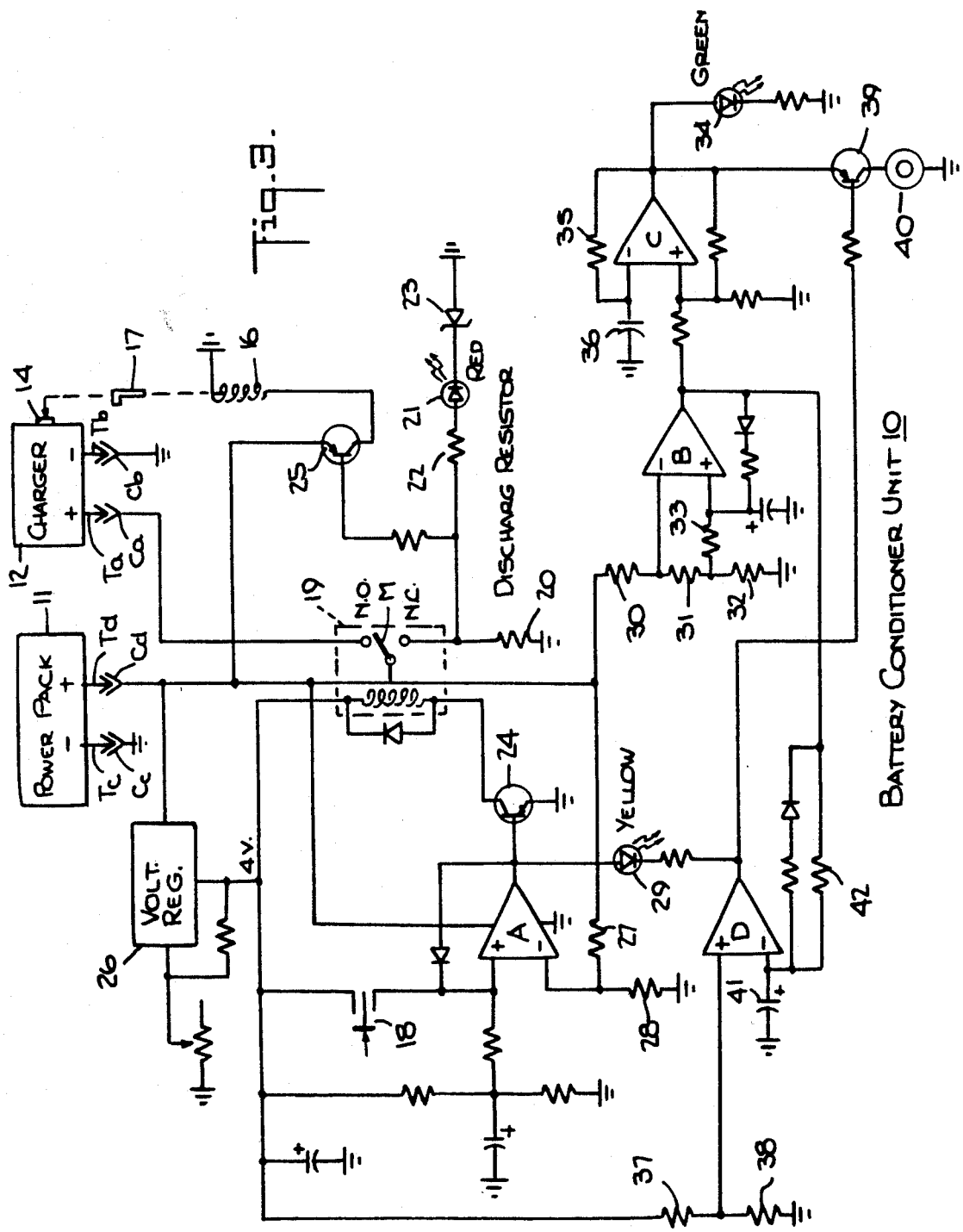

RECHARGEABLE BATTERY CONDITIONER UNIT

BACKGROUND OF INVENTION

1. Field of Invention

This invention relates generally to circuits for recharging Nickel-Cadmium (Ni-Cad) batteries, and more particularly to a piggyback battery conditioner unit usable in conjunction with a standard battery charger and a rechargeable Ni-Cad battery pack which normally is adapted to be seated on and connected to the charger, the unit when in use being physically and electrically interposed between the charger and the pack and serving to so condition the pack whereby when the pack is recharged it regains its full rated energy capacity.

2. Status of Prior Art

The major alkaline secondary or rechargeable battery is the Nickel-Cadmium (Ni-Cad) battery. It is noted for its high power capability and long cycle life, as well as for its ruggedness and reliability. Ni-Cad battery power packs, which are constituted by an encased set of serially-connected Ni-Cad batteries are widely used as power supplies for portable electronic equipment such as battery-powered radio and TV sets and hand-held camcorders.

A problem frequently encountered with Ni-Cad battery power packs is the degradation of the batteries resulting from repeated recharging operations. It has been demonstrated that as a result of a "memory effect" or "fading," that the energy capacity of a Ni-Cad battery can be decreased as much as 60 to 80% under operating conditions. Thus a user of a battery-operated camcorder often finds that while at the time the camcorder was first purchased, the Ni-Cad power pack was then capable of powering the camcorder for more than half an hour of operating time before it became necessary to recharge the power pack, after the power pack had been recharged several times, the power pack then becomes incapable of supplying power to the camcorder for more than fifteen minutes of operating time.

This characteristic of a Ni-Cad battery power pack represents a serious practical drawback in that the power pack does not live up to its rated energy capacity, and the portable electronic device which depends on the power supplied by the battery pack then ceases to function. The charger for the power pack, which includes a rectifier coupled by a step-down transformer to an AC power line to provide a DC output is not portable, for the charger must be plugged into an AC power line. Hence the user, say, of a camcorder powered by a Ni-Cad battery power pack, who goes on a field trip with the expectation of being able to record for a full half hour of operating time may find that after 10 minutes of operation the camcorder can no longer record. And the user of the camcorder is not then in a position to recharge his power pack.

Yet the reason for the failure of the power pack to live up to its rated energy capacity is not due to any defect in the particular Ni-Cad cells included in the pack, for all Ni-Cad batteries will fall short of their rated energy capacity unless they are properly conditioned before being recharged.

The "memory effect" or fading phenomenon characteristic of all Ni-Cad batteries is induced by shallow cycles of discharging and recharging. For example, if a Ni-Cad battery is operated so that it repeatedly delivers 50% of its full rated energy capacity and is then recharged, this battery will exhibit a sharp decrease in its ability to deliver a proper battery voltage when the battery is being operated beyond 50% of its full capacity. When a Ni-Cad cell is cycled repeatedly but is not fully discharged (shallow discharge), the battery gradually deteriorates to a much lower capacity level.

Manufacturers of electronic equipment powered by Ni-Cad battery power packs are fully aware of the "memory effect" phenomenon. Hence in the instruction manuals which accompany the equipment, the user is instructed that when the power has fallen to a degree at which the equipment no longer operates properly, that the battery pack first be fully discharged before it is placed in the charger for recharging.

What this means in practical terms, say, with a hand-held vacuum cleaner that includes a Ni-Cad battery pack, is that the user before seating the vacuum cleaner on the AC-powered charger unit, must continue to press the operating button of the vacuum cleaner to effect further discharge of the battery power pack.

Despite the fact that the user has read the instruction manual and is aware of the need for deep discharge before recharging, he will often not bother to carry out this operation, for it requires, even though his equipment is no longer functioning properly, that he continue to press the operating button. And when doing so, the user does not know when a state of deep discharge is attained, for the typical Ni-Cad battery pack has no such indicator.

And for each conscientious user of the equipment who has read the instruction manual, there are many who have not—hence the typical user makes it a practice to recharge his battery pack as soon as he senses that he is not getting adequate power. This practice inevitably leads to a degradation of the batteries because of the memory effect.

Indeed, Ni-Cad rechargeable batteries are thought by many consumers to be inferior to non-rechargeable long-life alkaline batteries; for while Ni-Cad batteries work well for a fairly short period after their purchase, the more often they are recharged, the poorer is their energy capacity.

The prior art recognizes that the "memory effect" exhibited by Ni-Cad batteries can be eliminated by reconditioning the batteries; that is, by subjecting them to deep discharge before recharging. One reference in the prior art provides a discharge circuit for Ni-Cad batteries which reduces its state of charge to a nominal zero, after which the battery can then be recharged to restore the battery to its full rated energy capacity.

A Ni-Cad battery, when fully charged, has a nominal voltage of 1.2 volts per cell, and it is regarded as "empty" when its voltage falls to 1.1 volts. A battery power pack consisting of 30 Ni-Cad cells in series has a nominal voltage of 36 volts, and when the voltage drops to 33 volts, the pack is depleted.

In the Brown patent, the discharging circuit includes means to sense the voltage across the battery terminals, and when the voltage sensed indicates that the battery is depleted, a switch is activated to connect a resistor across the terminals of the battery to deep discharge the battery.

The Yefsky U.S. Pat. No. 4,302,714 discloses a battery charger circuit for deep discharging a Ni-Cad battery to a predetermined level above cell reversal and then recharging the battery to its rated capacity. Similarly, in the Kapustka U.S. Pat. No. 4,084,124, a conditioner circuit acts to first deep discharge a Ni-Cad battery before it is recharged.

The Munning Schmidt et al. U.S. Pat. No. 4,849,681 discloses a discharger for a Ni-Cad battery to effect deep discharge before recharging takes place. In the Gabor et al. U.S. Pat. No. 4,878,007, the charger for a Ni-Cad battery produces repetitive periods of DC charging and discharging.

Of background interest is the Williams, U.S. Pat. No. 4,670,703, which points out that Ni-Cad batteries, should they be overcharged, such overcharging may result in internal damage to the battery or even explosion. When a Ni-Cad battery is already fully charged, further charging leads to a temperature rise causing "gassing." Since the battery is usually hermetically sealed, the internal pressure produced by gassing could explode the battery. In this patent, a microprocessor controls the charging rate to effect a safe charging level.

In the Webb U.S. Pat. No., 3,413,534, the battery charger for a Ni-Cad battery is microprocessor-controlled to obtain a discharge mode of operation and an auto cycle charging operation which is carried out after a discharge operation.

The disadvantage of prior art battery dischargers and chargers for Ni-Cad batteries is that they do not lend themselves to ready use with Ni-Cad battery power packs which are designed to be seated on and connected to a standard charger.

For example, a typical, commercially-available camcorder, such as a Sony portable camcorder, is provided with a Ni-Cad battery power pack whose output terminals are connected to the camcorder when the power pack is plugged into the camcorder. When it is necessary to recharge the pack, the pack is then unplugged from the camcorder and seated on a battery charger operated from the A-C power line, the pack terminals then engaging the terminals of the charger. When the pack is fully charged, the pack can then again be plugged into the camcorder. The problem with the Sony arrangement is that should the power pack not be deep discharged before being recharged, it will not upon recharging regain its full rated capacity.

If, therefore, one wished to deep discharge the Ni-Cad battery power pack with a discharge circuit of the type shown, say, in the Brown patent, one would have to connect the terminals of the power pack to a cable connecting the pack to the Brown discharge circuit, and upon completion of the discharge, to disconnect the pack from the cable and then seat the pack on the Sony battery charger.

While this procedure would present little difficulty to a skilled technician, the typical camcorder user possesses little in the way of technical skills. The need to cable-connect a battery pack to a special discharge circuit and then disconnect the cable each time it became necessary to recharge the pack renders the Brown arrangement unsuitable for the typical user.

One must bear in mind that literally millions of electronic devices powered by Ni-Cad battery packs are currently in use, and each user is provided with a standard charger adapted to recharge the power pack. The need therefore exists for a self-sufficient Ni-Cad battery conditioner unit that would make it possible for the typical user to deep discharge the power pack, yet in no way require modification of the pack or of the charger therefor.

SUMMARY OF INVENTION

In view of the foregoing, the main object of this invention is to provide a self-sufficient battery conditioner unit for use in conjunction with a Ni-Cad battery power pack which is designed to be seated on and connected to a standard charger, the unit when put to use being physically and electrically interposed between the charger the the power pack to create an assembly which functions to effect a deep discharge of the pack before it is recharged to its rated full energy capacity.

More particularly, an object of this invention is to provide a Ni-Cad battery conditioner which indicates to the user that the battery pack is being deep discharged, and when the charger thereafter proceeds to recharge the pack, then indicates to the user when the pack is being recharged and when it is fully recharged and in condition for reuse.

A significant advantage of the invention is that it requires no tools, cables or other accessories for a user to operate the battery conditioner unit, for all he is required to do is to seat the unit on the standard battery charger and to then seat the pack on the unit to create the assembly.

Also an object of this invention is to provide a self-sufficient conditioner unit of the above type which can be mass produced at relatively low cost, and which operates reliably and efficiently.

Briefly stated, these objects are attained in a piggyback conditioner unit usable in conjunction with a Ni-Cad battery power pack and a standard charger for the pack, the pack being normally adapted to be seated on and connected to the charger for recharging. The power pack is subject to a "memory effect" that decreases its ability to regain its rated energy capacity unless before being recharged, it is first discharged from its existing state of discharge to a deep discharge state. When put to use, the battery conditioner unit is physically and electrically interposed between the charger and the power pack to create an assembly in which the unit is seated on and electrically connected to the charger and the pack is seated on and electrically connected to the unit.

The unit includes means to further discharge the power pack seated thereon until a deep discharge state is reached, which condition is reflected in a reduced pack voltage that is sensed to automatically activate the charger which then proceeds to recharge the pack. When the pack is recharged to its full rated capacity, this condition is sensed by the charger which then switches to a low-current maintenance charge state. The resultant drop in charger voltage is sensed by the unit and indicated to inform the user that the pack is now fully recharged and in condition for reuse.

BRIEF DESCRIPTION OF DRAWINGS

For a better understanding of the invention as well as other objects and further features thereof, reference is made to the following detailed description to be read in conjunction with the accompanying drawings, wherein:

FIG. 3 is a schematic circuit diagram of the Ni-Cad battery conditioner unit.

DESCRIPTION OF INVENTION

The Assembly

Figure 1:
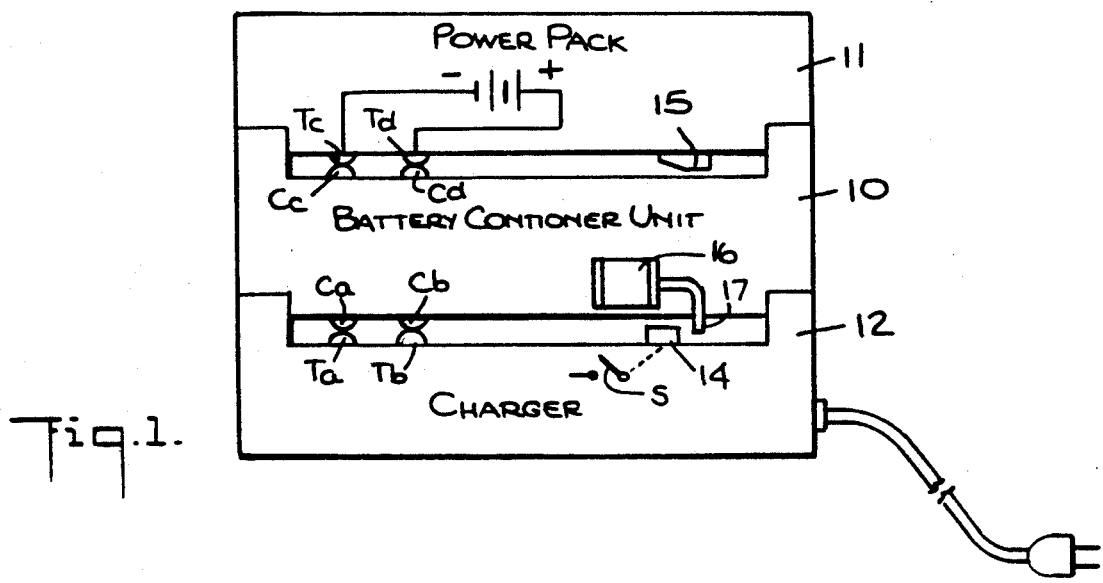
FIG. 1 shows in block diagram form a battery conditioner unit combined with a Ni-Cad battery power pack which is designed to be seated on and connected to a standard charger therefor to create an assembly functioning to deep discharge the power pack before it is recharged to its full rated energy capacity.

Referring now to FIG. 1, there is shown the relationship between a Ni-Cad battery conditioner unit 10 in accordance with the invention, a conventional Ni-Cad battery pack 11 and a standard charger 12 for the pack, the charger being connectable to an AC power line by a line terminating in a plug.

The charger includes a step-down transformer and a rectifier to produce a DC output at its output terminals $T_a$ and $T_b$, whose voltage is at a level appropriate to the rated voltage of the power pack. The charger, as is conventional in charger design, acts to switch to a low current maintenance charge state when it senses that the battery pack connected thereto is fully charged, this maintenance state producing a reduced charger voltage.

Conditioner unit 10 is seated in piggyback relationship on charger 12 so that its input contacts $C_a$ and $C_b$ on the underside of the unit then engage the charger output terminals $T_a$ and $T_b$. The Ni-Cad battery pack 11 is seated on top of conditioner unit 10 so that its output terminals $T_c$ and $T_d$ then engage the output contacts $C_c$ and $C_d$ of the unit. Thus the battery conditioner unit is physically and electrically interposed between the battery pack and the charger for the pack to create an assembly that functions to deep discharge the pack before it is recharged.

Charger 12 includes an on-off switch S operated by an actuator button 14 which when the battery pack is directly seated on the charger is engaged by a tab 15 on the underside of the battery pack, the tab acting to shift the button to actuate switch S and thereby turn on the charger. Conditioner unit 10 includes a solenoid 16 which operates an armature tab 17 that when the solenoid is energized, engages and shifts actuator button 14 to activate the charger.

Figure 2:
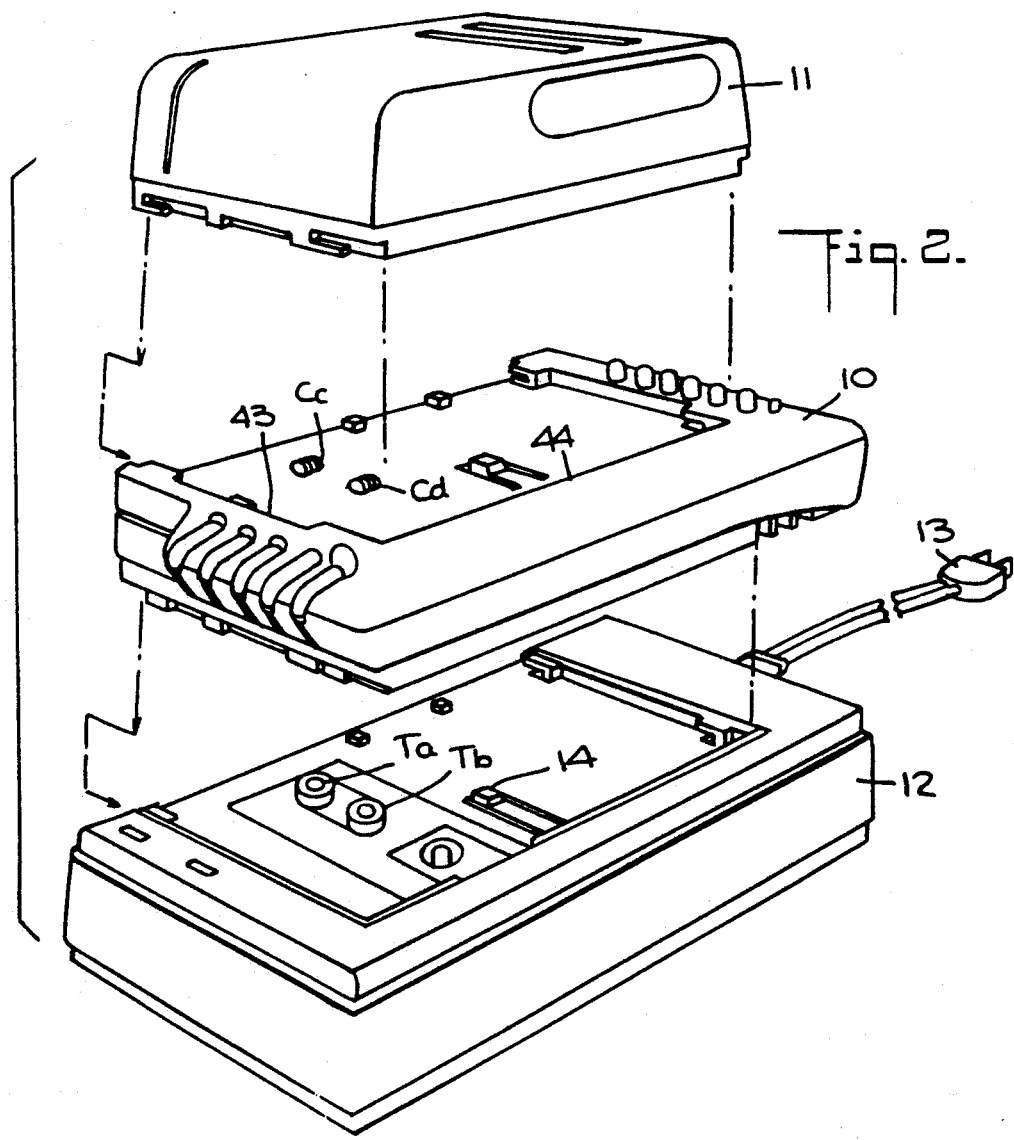
FIG. 2 is an exploded view of the elements of the assembly.

The actual physical relationship of the conditioner unit 10, the battery pack 11 and the charger 12 is shown in FIG. 2, in which the battery pack and the charger are of the type used in conjunction with a Sony camcorder. In operating the camcorder, the Ni-Cad power pack 11 is plugged into the camcorder, and when the need to recharge the power pack arises, the power pack is then seated on the charger, the action causing the charger to turn on. As will be seen in FIG. 2, conditioner unit 10 is adapted to be interposed between the charger and the power pack.

When so interposed, conditioner 10 shunts a resistor across the output terminals of the power pack, the resistor acting to deep discharge the power pack. When the power pack is undergoing deep discharge, this is indicated by a red light. And when the pack attains its deep discharge state, as reflected in a reduced battery voltage, this drop in voltage is sensed to effect energization of solenoid 16 to turn on the charger which then proceeds to recharge the battery pack. This charging action is indicated by a yellow light which turns on when the red light turns off.

When the battery pack is fully charged, this condition is sensed by the charger which switches to a low-current maintenance charge state. The resultant sudden drop in charger voltage is sensed to produce a blinking green light which indicates that the battery is fully charged and ready for reuse. When the charged battery pack is removed from the conditioner unit, the blinking green light goes off and the circuit resets in preparation for the next operation.

Also to call the user's attention to the fact that the battery pack is fully recharged and ready for use, an audio signal is generated the moment the blinking green light is turned on. This audio signal is turned off automatically after a predetermined period, but the green light continues to flash as long as the battery pack remains in place in the assembly.

The Battery Conditioner Unit

Referring now to FIG. 3, there is shown the circuit of the battery conditioner unit 10 whose input contacts $C_a$ and $C_b$ are connected to the output terminals $T_a$ and $T_b$ of battery charger 12, and whose output contacts $C_c$ and $C_d$ are connected to output terminals $T_c$ and $T_d$ of Ni-Cad battery power pack 11, which is partially discharged. Even after depleting the power pack so that it can no longer run the camcorder, the residual power in power pack 11 is sufficient to power the conditioner unit circuit which requires relatively little current.

In those situations where the user decides that he lacks the time necessary to permit deep discharge of the power pack and needs to recharge it immediately, then a bypass push-button switch 18 is manually operated by the user which causes the battery to go directly into the charge cycle without first being deep discharged.

When battery pack 11 is in a partially discharged or shallow discharge state, then when it is connected to conditioner unit 10, the positive terminal $T_d$ of the battery pack is connected through the normally-closed contact N.C. of a relay 19 to ground through a battery discharge resistor 20, the negative terminal of the pack being grounded. Hence at the outset of conditioning, resistor 20 is then shunted across the Ni-Cad battery pack 11, and further discharge of the battery takes place. This discharge action is indicated by a red LED 21 connected between relay contact N.C. and ground through a resistor 22 and a diode 23.

When battery pack 11 attains a state of deep discharge, a comparator A, whose output is applied to relay 19 through a transistor 24, acts to energize the relay to cause its moving contact M to engage the normally-open contact N.O., this action disconnecting power pack 11 from discharge resistor 20 and connecting it to charger 12. When the moving contact M of the relay is on the normally-closed contact N.C. to effect discharge, the resultant voltage drop across discharge resistor 20 then applies a cut-off bias to a transistor 25 to cut off the application of the power pack voltage at terminal $T_d$ to solenoid 16.

But when at the completion of deep discharge, the relay movable contact M is caused to engage the normally-open contact N.O., then transistor 25 is rendered conductive and acts to connect solenoid 16 to the positive terminal $T_d$ of the power pack, thereby energizing the solenoid which in turn, through its armature tab 17 which engages actuator button 14, acts to switch on charger 12. This charger, through the normally-open contact N.O., then proceeds to recharge the power pack. During the deep discharge cycle, charger 12 must be disassembled. The charger circuit is such that if no battery voltage is identified, the charger shuts itself off automatically.

Applied to the positive + input of comparator A is a reference voltage derived from a voltage regulator 26 connected to the positive terminal $T_d$ of power pack 11.

Connected to the negative terminal of comparator A is a voltage taken from a voltage divider formed by resistors 27 and 28 connected in series between the positive terminal $T_d$ of the power pack and ground.

When the voltage applied to the negative input of comparator A falls as a result of the deep discharge of the battery pack to a level below the level of the regulated reference voltage applied to the positive terminal, then comparator A changes state to actuate relay 19 and thereby turns on the charger. This action is indicated by a yellow LED 29 connected to the output of comparator A. When the yellow indicator is on, this indicates that charging of the battery is taking place.

During the charging cycle in which the yellow indicator 29 is turned on, the voltage from the charger in conjunction with the charge acceptance of the battery gradually rises. When the internal circuit of battery charger 12 determines that the battery is in a fully charged state, the charger then switches to a low-current maintenance charge state. When this occurs, there is a sudden drop of voltage.

Connected to the positive terminal $T_d$ of battery power pack 11 is a comparator B whose negative input is connected to the junction of resistors 30 and 31 and whose positive input is connected through a resistor 33 to the junction of resistors 31 and 32. Resistors 30, 31 and 32 are connected in series between the positive terminal $T_d$ of the power pack and ground to form a voltage divider.

Comparator B is set to sense the voltage drop which takes place in the charger output when the power pack attains its full charge, and the charger output then changes its output state. The output of comparator B is applied to the positive input terminal of a comparator C whose output is applied to a green LED 34. The output of comparator C is fed back through a resistor 35 to its negative input which is connected to ground through a capacitor 36 so that comparator C, which is activated by comparator B, oscillates to produce pulses causing green LED 34 to flash intermittently. This blinking action indicates that the battery power pack is fully charged.

The output of comparator B is also applied to the negative input of a comparator D whose positive input is connected to the junction of voltage-divider resistors 37 and 38 connected in series between the output of voltage regulator 26 and ground. The output of comparator D is applied through a transistor 39 to a piezo buzzer 40 to activate this buzzer. Comparator D, which is provided with an R-C timing circuit in its negative input including capacitor 41 and resistor 42, turns off after a predetermined time interval and thereby deactivates buzzer 40.

Thus when the power pack is fully charged, the user is notified of this fact by both the blinking green light and the buzzer sound. But if the user then takes no step to remove the charged pack from the charger, the buzzer cuts off after a predetermined period, whereas the green indicator continues to blink until such time as the power pack is withdrawn from the charger.

At the outset of the conditioner operation, if the power pack seated on the battery conditioner unit is already deep discharged, the negative input at comparator A will immediately be sensed as being below the reference voltage and transistor 24 will immediately switch relay 24 to effect charging. When the user is in a hurry and cannot wait for deep discharge to take place and therefore operates the bypass switch 18, this action applies the full voltage from voltage regulator 26 to the positive input of comparator A, the resultant change of state causing relay 19 to operate to effect engagement of the normally-open contact N.O., thereby connecting the output terminals of charger 12 to the output terminals of power pack 11. As charging proceeds, the yellow indicator 29 remains on to indicate this action, but when the power pack is fully charged, then the blinking green light 34 turns on.

But should the power pack, when first seated on the battery condition unit, not be in a deep discharge state, then the red indicator 21 turns on to indicate that deep discharging is taking place, this being followed in due course by the turning on of the yellow indicator to indicate that charging is taking place, and by the later turning on of the green indicator to indicate that the pack is now fully charged. The three LED indicators are mounted on the upper side of the conditioner unit in an end alcove 43 adjacent the recess 44 in which the power pack is seated, so that the indicators are visible to the user.

While there has been shown and described a preferred embodiment of a rechargeable battery conditioner unit in accordance with the invention, it will be appreciated that many changes and modifications may be made therein without, however, departing from the essential spirit thereof. It is to be noted that the power pack and charger shown in FIG. 2 is that included in a SONY camcorder, and that the form but not the function of the power pack and the charger therefor will in other types of battery powered electronic devices differ from that shown in FIG. 2. But whatever forms the power pack and the charger therefor take, the battery conditioner unit is designed to conform to these forms, so as to be interposable therebetween.

The function of relay 19 can in practice be carried out by a solid-state power transistor arrangement, the only advantage of a relay being that it is less expensive. And instead of using a fixed resistor 20 to effect deep discharge, this action may be carried out by a voltage-controlled transistor, the control voltage being varied to cause the resistor to function as a variable resistance. In this way, the rate of deep discharge may be varied so that initially deep discharge takes place slowly and then more rapidly as the deep discharge state is approached.

It is important to note that once a NiCad battery has developed a "memory," it can be fully revitalized by several deep discharges and recharges.

We claim:

1. A battery conditioner unit usable in conjunction with a Ni-Cad battery power pack which is in a state of partial discharge, the pack, is normally seated on and connected to a charger for the pack, said pack being subject to a memory effect that decreases its ability to regain its fully rated energy capacity unless the pack is in a deep discharge state before being recharged, the unit when put to use being physically and electrically interposed between the charger and the pack to create an assembly in which the unit is seated on and electrically connected to the charger and the pack is seated on and electrically connected to the unit, said charger being provided with an operating switch, said conditioner unit comprising:

(a) means to effect further discharge of the power pack seated thereon until a deep discharge state is reached, as reflected in a reduced pack voltage;
   (b) means responsive to said reduced voltage to connect said charger to said pack; and (c) means responsive to said reduced voltage to actuate said charger switch, whereby the charger then proceeds to recharge the pack connected thereto.

2. A unit as set forth in claim 1, including a first indicator that is activated only when the pack is being deep discharged.

3. A unit as set forth in claim 2, including a second indicator that is activated only when the pack is being recharged.

4. A unit as set forth in claim 3, including a third indicator that is activated only when the pack is fully recharged.

5. A unit as set forth in claim 4, wherein said indicators are LED light indicators of different color.

6. A unit as set forth in claim 4, further including a buzzer that is activated for a predetermined period only when the third indicator is activated.

7. A unit as set forth in claim 1, wherein said pack has an output terminal and said charger has an output terminal, and said unit is provided with an input contact that when the unit is seated on the charger engages the charger terminal, and an output contact which engages the pack terminal when the pack is seated on the unit.

8. A unit as set forth in claim 7, further including a relay having a movable contact that engages a normally-closed contact and which when the relay is energized then engages a normally-open contact, the movable contact being connected to the output contact of the unit, the normally-closed contact being connected to a discharge resistor and the normally-open contact being connected to the input contact of the unit, whereby initially the pack is deep discharged through the resistor, after which the relay is energized, whereby the output terminal of the charger engaged by the input contact of the unit is then connected through the output contact of the unit to the terminal of the pack.

9. A unit as set forth in claim 8, further including a solenoid operatively coupled to the switch of the charger, and means to energize the solenoid when the pack reaches its deep discharge state, whereby the charger is then activated.

10. A unit as set forth in claim 8 provided with means to energize said relay including a comparator that is responsive to said reduced voltage when said pack reaches the deep discharge state.

* * * * *